United States Patent [19]
Tariel et al.

[11] 3,769,118
[45] Oct. 30, 1973

[54] THERMAL INSULATION OF RECEPTACLES FOR CRYOGENIC FLUIDS

[75] Inventors: Henri Tariel, Rillieux; Roger Guyon, Oullins; Yves Gagneux, Saint-Martin-D'Heres; Franck Muller, Grenoble; Yves Louis, Echirolles, all of France

[73] Assignee: L'Air Liquide, Societe Anonyme Pour L'Etude et L'Exploitation Des Procedes Georges Claude, Paris, France

[22] Filed: Feb. 8, 1971

[21] Appl. No.: 113,245

[30] Foreign Application Priority Data
Feb. 13, 1970 France .............................. 7005193

[52] U.S. Cl. .................... 156/71, 156/159, 156/258, 156/265, 156/266, 156/297, 156/304, 161/40, 161/44, 161/145, 161/149, 161/159, 220/9
[51] Int. Cl. ............................................. E04b 2/00
[58] Field of Search ...................... 156/71, 157, 159, 156/258, 264–266, 297–300, 304, 172, 184–188, 303.1, 193; 161/36–44, 149, 118, 145; 220/9

[56] References Cited
UNITED STATES PATENTS
3,578,541  5/1971  Tariel............................... 161/37 X
3,139,371  6/1964  Sisko................................. 161/37
3,180,058  4/1965  Tillisch et al. .................... 161/44 X
3,339,326  9/1967  Derr et al. ......................... 161/38 X
1,638,280  8/1927  Utzman............................. 161/118 X
1,931,650  10/1933  Elmendorf........................ 156/297 X
3,339,780  9/1967  Forman et al. ................... 161/43 X
3,591,443  7/1971  Cox................................... 161/160 X Primary Examiner—William A. Powell
Attorney—Young & Thompson

[57] ABSTRACT

This invention relates to the thermal insulation of reservoirs for cryogenic fluids with panels of a gas-tight thermal insulation material, bonded with an adhesive to the outer surface of the metal walls of said reservoirs. The tightness of the bond line between the tank wall and the insulating material is improved by uniformizing the material by heat curing, by coating the surface irregularities with an adhesive suited to a thick application at low temperatures, by reinforcing said adhesive with a cloth. The tightness of the bond line between the panels is improved by bevelling the panels so as to form between them a Y-shaped joint and sealing said joint by bonding a V-shaped closing tongue made of the same material.

4 Claims, 3 Drawing Figures

PATENTED OCT 30 1973  3,769,118

THERMAL INSULATION OF RECEPTACLES FOR CRYOGENIC FLUIDS

This invention relates to a method for thermally insulating tanks for cryogenic fluids.

By "tank for a cryogenic fluid" is meant any vessel designed for receiving or storing cryogenic fluids such as liquid oxygen, liquid hydrogen, liquefied natural gas, but also the transfer piping for such fluids. Such tanks may be more specifically those of launch vehicles or of space ships.

For some applications, particularly in the case of launch vehicle tanks containing cryogenic liquids such as liquid oxygen or liquid hydrogen, it is desirable to thermally insulate tanks for cryogenic liquids by means of at least one layer of a material having a low thermal conductivity and comprising contiguous panels bonded at room temperature on the outer surface of the metal wall of the tank.

The cryopumping of the gases surrounding the cryogenic tank (such as air gases) is the main problem to be solved to store in this way liquefied gases with low boiling points. This is because the metal outer surface of the tank, on which the insulating material is applied, acts as a cryogenic trap if the insulating structure is permeable to the gases surrounding the tank which are condensable at the temperature of the liquefied gas in the tank. The gases thus trapped can vaporize under the action of any accidental or permanent heat flux and can cause destruction of the thermal insulation through bursting the layer of insulating material. These incidents should particularly be avoided in space ships, where the reliability and effectiveness of the insulation are a must.

To obviate this phenomenon, materials with low thermal conductivities and impervious to air gases are used. Such materials also have mechanical properties which are sufficient to withstand the strains to which the insulating layer is subjected when the tank is in use : differential thermal contraction of the metal wall of the tank and of the insulating material at the bond line, strains induced into the insulating material by the metal wall when the tank is being pressurized, etc. Such materials are for instance rigid expanded materials with closed cells, made of polyvinyl chloride on which are grafted side chains of copolymers formed from at least one vinylidenic monomer and one anhydride of an ethylenic carboxylic acid copolymerizable with the said monomer, the said side chains being cross-linked through the formation of at least two amide groups between the isocyanate groups of a polyisocyanate and the acid anhydride groups of the said anhydride. Such materials have been described for instance in U.S. Pat. No. 3,200,089. For applying on the outer surface of a cryogenic tank including a cylindrical body, such materials are cut into rectangular panels which are heat preformed to the curvature of the body, then contiguously assembled and bonded on the said body by means of any suitable adhesive.

A gas-tight material having been found, the problem of the impervious properties of the insulating structure is transferred to the joints ; joint between the outer metal surface of the cryogenic tank and the insulating material, but also joints between the panels of insulating material. These joints are usually formed by any adhesive material with good properties at low temperatures. If no cryopumping can take place through the insulating material, it can still occur at the bond lines between the panels of insulating material and between the metal and the said material. The various adhesive bonds therefore play an important part in the impervious properties of the insulating structure.

The impervious properties of the adhesive joint between the metal wall of the cryogenic tank and the insulating material raise some problems.

The uniformity of the above-mentioned expanded materials is imperfect. For instance, measurements of elongation at break, made on a number of testing specimens from the same panel of rigid material with closed cells, are greatly scattered. Such lack of uniformity does not favor good heat preforming of the panels to the curvature of cylindrical tanks, since it is difficult to achieve uniform and therefore controllable deformations.

The outer surface of cryogenic tanks always shows a number of protuberances : weld seams, etc. This leads to applying more adhesive on those areas than on the rest of the tank surface. Now, if adhesive suitable for cryogenic is to remain mechanically strong and therefore gas-tight at low temperatures, it should be deposited as a very thin film. Consequently, the metal-insulation joints run the risk of not remaining gas-tight in all these areas, due to cracking of the adhesive.

Besides, it is very difficult, when bonding, to achieve uniform distribution of the adhesive, and all thick spots may give cracks in the adhesive joints at low temperatures.

For a cylindrical tank, the insulating material, usually cut into panels, is heat preformed so as to fit the curvature of the cylinder. The panels are then bonded contiguously so as to form adjoining rings. This technique does not allow a correct fitting of the panels onto the surface of the tank while curing the bonding adhesive.

When contiguous panels of the insulating material are bonded on the outer surface of the cryogenic tank, the impervious properties of the joints between panels give difficulties.

To achieve impervious properties between the panels, projecting joints with straight notches have been suggested. Such joints, however, have some disadvantages. They are hidden, and it is difficult to check that the adhesive has been well distributed over the joints. Therefore, such joints have low reliability.

One object of this invention is therefore to improve the impervious properties of joints between the outer surface of the metal wall of a tank for cryogenic fluids and a gas-tight thermal insulating material with suitable mechanical properties bonded on the said surface.

Another object of the invention is to improve the impervious properties of joints between the panels of insulating material when contiguous panels of the said material are bonded on the outer surface of the tank.

Another object of the invention is to avoid the occurence of cryopumping through the adhesive material of the various joints of an insulating structure employing a gas-tight insulating material.

Another object of the invention is to improve the impervious properties of the entire insulating structure of a tank for cryogenic fluids.

According to the invention, it has been found that the impervious properties of the adhesive joint between the outer surface of the tank and the gas-tight insulating material, the said material having suitable mechanical properties to withstand the strains to which it is subjected when the tank is in use, could be improved by preceding the bonding of said insulating material with uniformizing the said material through heat curing, coating the irregularities of the said surface with an adhesive suitable for use in great thicknesses at low temperatures, and reinforcing the adhesive by means of a cloth.

Heat curing gives thermal stabilization of the insulating material. Its properties are thus made uniform thoughout each panel, especially its coefficient of thermal expansion and its mechanical properties. Its behaviour during heat forming is thereby made uniform, which accordingly improves the quality of this operation. Since the panels of insulating material fit all the better the shape of the metal surface on which they are applied, the impervious properties of the adhesive joint are correspondingly improved.

When coating the irregularities of the metal surface, such as weld seams, etc., with an adhesive suitable for use in greater thicknesses at cryogenic temperatures (e.g., epoxy polyamino-amide resins), all the aforesaid weaknesses of the adhesive joint between metal and insulating material, which might impair its impervious properties through cracking, are eliminated. The tank surface being uniformized, this coating makes it possible to eliminate the "post-forming" operation, which consists in momentarily applying the preformed insulating panels onto the heated tank walls so as to impress in the insulating material the local irregularities of the walls before the bonding operation.

Through reinforcing the adhesive with a cloth, the outer surface of cryogenic tanks can be coated with the adhesive-impregnated cloth, e.g., through wrapping around the tank. This makes it possible to obtain uniform bonding and to control the weight of adhesive applied per unit of surface area. Such uniformity, characterized by the absence of any excess of adhesive, favors low-temperature strength and therefore the impervious properties of the joint between the metal and the insulating material at low temperatures. The presence of a cloth also speeds up the process.

The tanks for cryogenic liquids to be thermally insulated comprise usually a cylindrical body and flat or rounded ends. To insulate rounded ends, the "gore-segment" technique is used. To insulate the body, the material is cut into panels which are heat preformed to the curvature of the tanks, then assembled and bonded onto the outer surface of the tank body.

In the latter case, it has been found that the impervious properties of the adhesive joint between the metal and the insulating material are substantially improved by cutting the insulating material into at least one group of rectangular panels, one dimension of which (e.g., length) being such that the panels of the same group, placed end to end along the said dimension, have a total length lower than the circumference of the cylindrical body, heat preforming the said panels to the curvature of said cylindrical body, contiguously bonding the panels of a same group and the panels belonging to adjoining groups on the surface of said cylindrical body, the panels of a same group forming an open ring with a gap and after said bonding of said panels closing the said gap by bonding a closing plate cut from the said insulating material.

When proceeding in the above manner, the panels are allowed to place themselves in position while they are being bonded, and it is possible to accomodate for various tolerances. This improves considerably the impervious properties of the joint between the metal and the insulating material. On the other hand, when adhesive curing is carried under a vacuum bag, the above procedure favors the rise of the adhesive into the joints between the preformed panels.

When the gas-tight insulating material is cut into panels and when these panels are bonded on the outer surface of the metal walls of a tank of any shape for cryogenic fluids, it has been found, according to this invention, that the impervious properties of the adhesive joints between the panels could be improved by bevelling the said panels before bonding so that they form, once bonded, a Y-shaped joint between them, and by closing the said joint after bonding of said panels by sticking a V-shaped closing tongue cut from the said insulating material.

This particular joint and its closing method have many advantages as to impervious properties. Firstly, before the V-shaped tongue is stuck, the distribution of the adhesive can be controlled. Secondly, the tongues place themselves in position while they are being bonded and they do not require precision machining.

According to this invention, the gas-tight material with low thermal conductivities may be any rigid expanded material with closed cells, such as the materials mentioned above and described for instance in U.S. Pat. No. 3,200,089.

For a better understanding of the invention, reference will now be made, by way of example, to the accompanying drawing in which.

Figure 3:
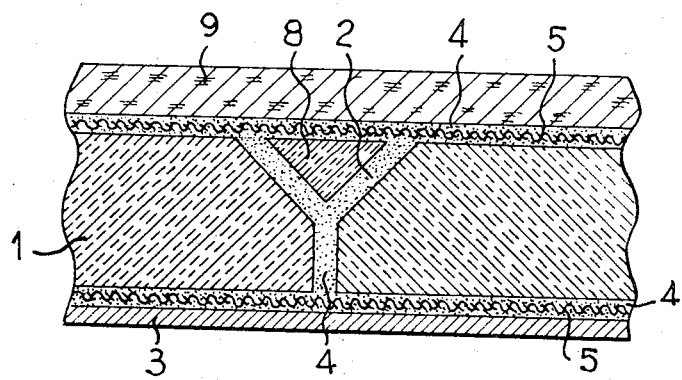
FIG. 3 illustrates a cross section of a complete insulating structure.

We shall now describe, as an example, a method making it possible to create outside a cylindrical metal tank of a launch vehicle, an entirely gas-tight insulating structure corresponding to the one represented in FIG. 3 which obviates the occurence of cryopumping phenomena.

Rectangular panels 1 with approximately equal dimensions are cut from a rigid expanded material with closed cells, the main component of which is poly-vinyl chloride, such as the materials described in U.S. Pat. No. 3,200,089. The principal characteristics of such a material can be the following :

Specific weight : the selected nominal value is 50 kg/m3 with a variation of ∓ 5 kg/m3 ;

Thermal expansion coefficient : its mean value between 300 K and 20 K is $36 \cdot 10^{-6}/°K$ ;

Heat conductivity coefficient : its mean value between 20 K and 300 K is $2,1 \cdot 10^{-2}$ W/m.K ;

Elongation at break $\epsilon r$ :

12 % ≤ $\epsilon r$ ≤ 6 % at 300 K 1,4 % ≤ $\epsilon r$ ≤ 1,8 % at 20 K.

The panels have one dimension (e.g., length) such that a given number of panels or a group of panels placed end to end along that dimension have a total length lower than the circumference of the tank body. The advantage of this shall appear later on.

The panels 1 are then subjected to a thermal stabilization treatment or heat curing, then trimmed.

The panels 1 are then heat formed to the curvature of the body, then bevelled so that the panels contiguously assembled on the tank body form Y-shaped joints 2.

In the meantime, the metal surface 3 of the tank is degreased, etched, rinsed, dried, and temporarily protected by spraying a protective film. The protuberances of the outer surface of the body (weld seams, etc.) are then locally coated with an epoxy resin hardened with polyamino-amides and suited to a thicker application at low temperatures.

The bonding operation is then undertaken. A suitable adhesive resin 4 (e.g., an epoxy resin) is reinforced with a light glass cloth 5. The cloth 5 impregnated with said resin 4 is then wrapped around the body of the tank.

Figure 1:
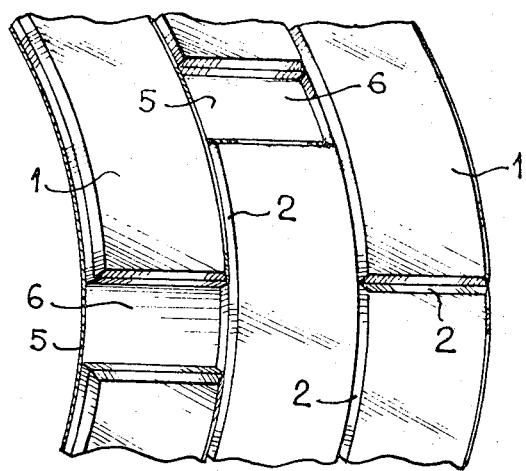
FIG. 1 illustrates a part of the insulating structure of a cylindrical cryogenic tank when preformed panels of the insulating material have been bonded to the outer surface of said tank.

The preformed panels 1 of insulating material are then bonded. As shown on FIG. 1, the panels preformed to the curvature of the tank are contiguously assembled on the surface of the body, but the panels of a group such as defined above leave a gap 6, not closed by insulating material at this stage of the process, since the total length of the panels of a same group is lower than the circumference of the cylindrical body. The insulating material is clamped by means of a vacuum bag while the adhesive is being polymerized.

Figure 2:
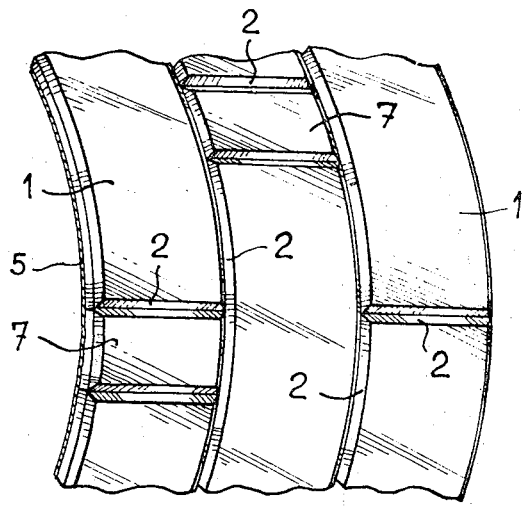
FIG. 2 illustrates same part of the insulating structure when the closing plates have been bonded.

As shown on FIG. 2, after bonding of panels 1, gaps 6 are closed by closing plates 7 fitted to the actual dimensions of said gaps, cut from the same insulating material as panels 1, and bevelled in the same manner as panels 1. The bonding of closing plates 7 also occurs under a vacuum bag.

The Y-shaped joints 2 formed between said panels 1 and between a closing plate 7 and the adjoining plates 1 are coated with resin 4. V-shaped closing tongues 8, cut from the insulating material of panels 1, are then bonded under a vacuum bag in the Y-shaped joints 2.

The same resin-impregnated glass cloth 5 is then wrapped around the insulating layer. This cloth can be used to retain an ablative thermic material layer 9 such as cork which limits within a permissible range the service temperature of the insulating structure at the time of the kinetic heating during the flight path through the earth atmosphere.

The result of this method leads to an insulating structure such as shown on FIG. 3.

As an example, in the case of a liquid hydrogen tank, the metal wall is 0.8 mm thick and is made of an aluminium alloy. The gas-tight thermal insulating material is 16 mm thick. The layer of epoxy-polyamide adhesive is 0.2 mm thick and is reinforced with a glass cloth. The layer of insulating material is covered with a resin-impregnated glass cloth 0.2 mm thick. The ablative material coating thickness is over 0.5 mm. The insulation structure weight is about 1,870 kg/m2, and 1.22 kg/m2 when the ablative material is not required.

The performances of the thermal insulation obtained according to this invention have been investigated by two kinds of tests. First, static tests were made to check that the thermal insulation was not damaged by thermal stresses, by structural deformations, nor by several uses. Tests were then made to evaluate the thermal performances of the thermal insulation. All these tests have shown the outstanding impervious properties of the adhesive joints obtained according to this invention and the outstanding strength properties and thermal properties of the insulating structure.

Cryogenic tanks insulated according to this invention can be used in launch vehicles or space ships, owing to their low weight. They can be used with advantage for storing any liquefied gas.

What we claim is:

1. A method of thermally insulating a metal-walled tank for a cryogenic fluid including protuberances in the outer surface, by securing on the outer surface of the metal wall of said tank a layer of a gas-tight expanded plastic insulating material, comprising the steps of
   a. heat curing said insulating material in order to make uniform the thermal expansion coefficient and mechanical properties thereof,
   b. coating the protuberances of said outer surface with a first adhesive which is resistant to cracking when applied in sufficient thickness to resist cracking and to cover the protuberances,
   c. applying a cloth impregnated with a second adhesive of different composition from said frist adhesive, on said outer surface resulting from step b), so as to form thereon a coating of said second adhesive, and then
   d. bonding on said cloth said layer of said insulating material resulting from step a).

2. A method according to claim 1, wherein said layer comprises a plurality of contiguous panels cut from said insulating material, and the further steps of
   e. during step d), bonding said panels in a contiguous manner on said cloth,
   f. bevelling said panels before step e), so as to form between them, after step e), Y-shaped joints,
   g. coating said Y-shaped joints with said second adhesive, and then
   h. closing said coated Y-shaped joints by adhesively securing therein V-shaped closing tongues cut from the same said insulating material.

3. A method according to claim 1, wherein the said tank comprises a cylindrical body, and the further steps of
   i. cutting said insulating material into at least one group of rectangular panels, at least one dimension thereof being substantially the same for all the panels, and the other dimension thereof being such that the panels of said group, placed end to end along the said other dimension, have a total length less than the circumference of the said body,
   j. heat-preforming the rectangular panels to the curvature of said body,
   k. during step d), contiguously bonding the preformed panels on said cloth, the panels of said group forming an open ring which leaves a gap,
   l. cutting a closing plate from the same said insulating material, fitted to the actual dimensions of said gap resulting from step (k), and
   m. bonding said closing plate in said gap.

4. A method according to claim 3, and the further steps of
   n. bevelling said rectangular panels before step (k) and said closing plate before step (m), so as to form between them, after steps (k) and (m), Y-shaped joints,
   o. coating said Y-shaped joints with said second adhesive, and then
   p. closing said coated Y-shaped joints by adhesively securing therein V-shaped closing tongues cut from the same said insulating material.

* * * * *